US008797584B2

(12) United States Patent
Akiba

(10) Patent No.: US 8,797,584 B2
(45) Date of Patent: Aug. 5, 2014

(54) INFORMATION PROCESSING APPARATUS, DATA ERASURE MANAGING METHOD AND COMPUTER PROGRAM

(75) Inventor: Tomohiro Akiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 13/526,178

(22) Filed: Jun. 18, 2012

(65) Prior Publication Data

US 2012/0327464 A1 Dec. 27, 2012

(30) Foreign Application Priority Data

Jun. 27, 2011 (JP) ................................. 2011-141547

(51) Int. Cl.
*G06K 15/02* (2006.01)
(52) U.S. Cl.
USPC ........................................ 358/1.15; 358/1.16
(58) Field of Classification Search
USPC ........................................................ 358/1.15
See application file for complete search history.

(56) References Cited

U.S. PATENT DOCUMENTS

| 7,716,432 B2 | 5/2010 | Yoshiura et al. | |
| 8,417,105 B2* | 4/2013 | Kimoto | ........................ 396/109 |
| 2007/0148948 A1* | 6/2007 | Tanaka | ........................ 438/602 |

FOREIGN PATENT DOCUMENTS

| JP | 3715711 B2 | 11/2005 |
| JP | 4386787 B2 | 12/2009 |

* cited by examiner

*Primary Examiner* — Mark Zimmerman
*Assistant Examiner* — Marchelle L Taggart
(74) *Attorney, Agent, or Firm* — Fitzpatrick, Cella, Harper & Scinto

(57) ABSTRACT

An information processing apparatus comprises: a first storing unit which stores a job; a performing unit which performs the job stored in the first storing unit; an erasing unit which performs overwriting erasure of the job performed by the performing unit; a first recording unit which records first time information indicating a time when the performance of the job by the performing unit is completed, for each job; a second recording unit which records second time information indicating a time when the overwriting erasure of the job stored in the first storing unit is completed by the erasing unit; and a predicting unit which predicts, for each job, whether or not the erasure of the job was completed, based on the first time information and the second time information.

7 Claims, 8 Drawing Sheets

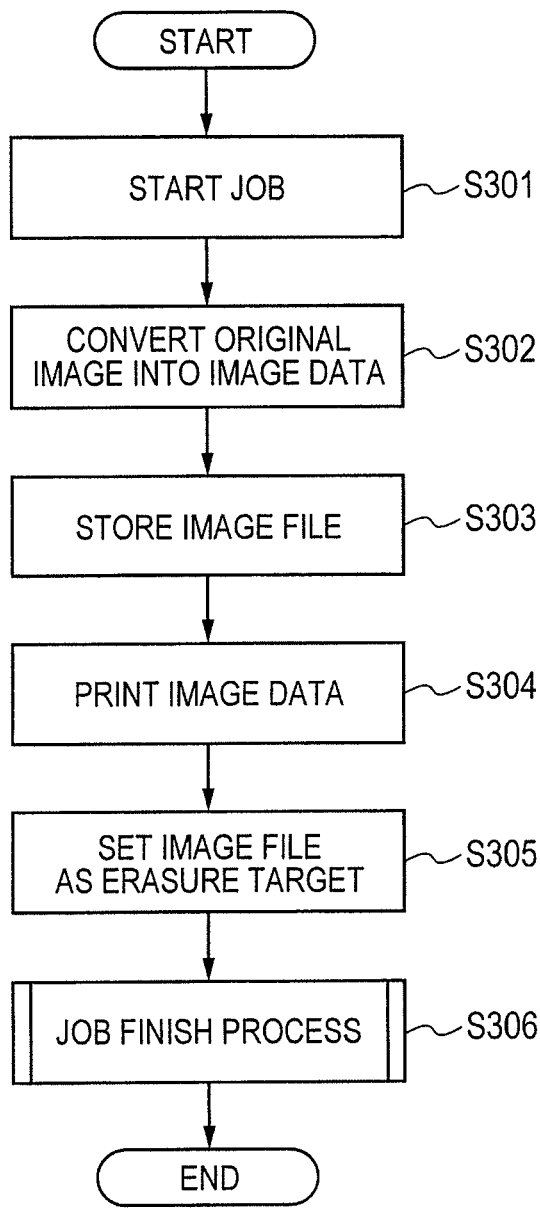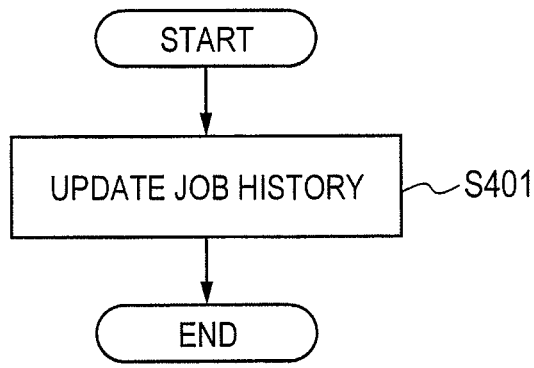

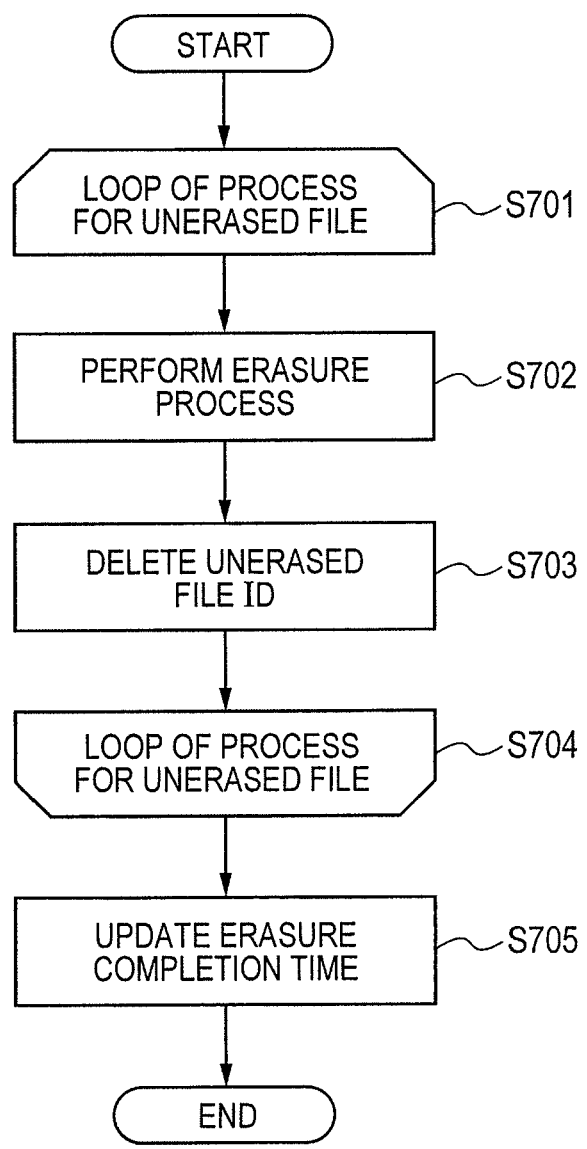

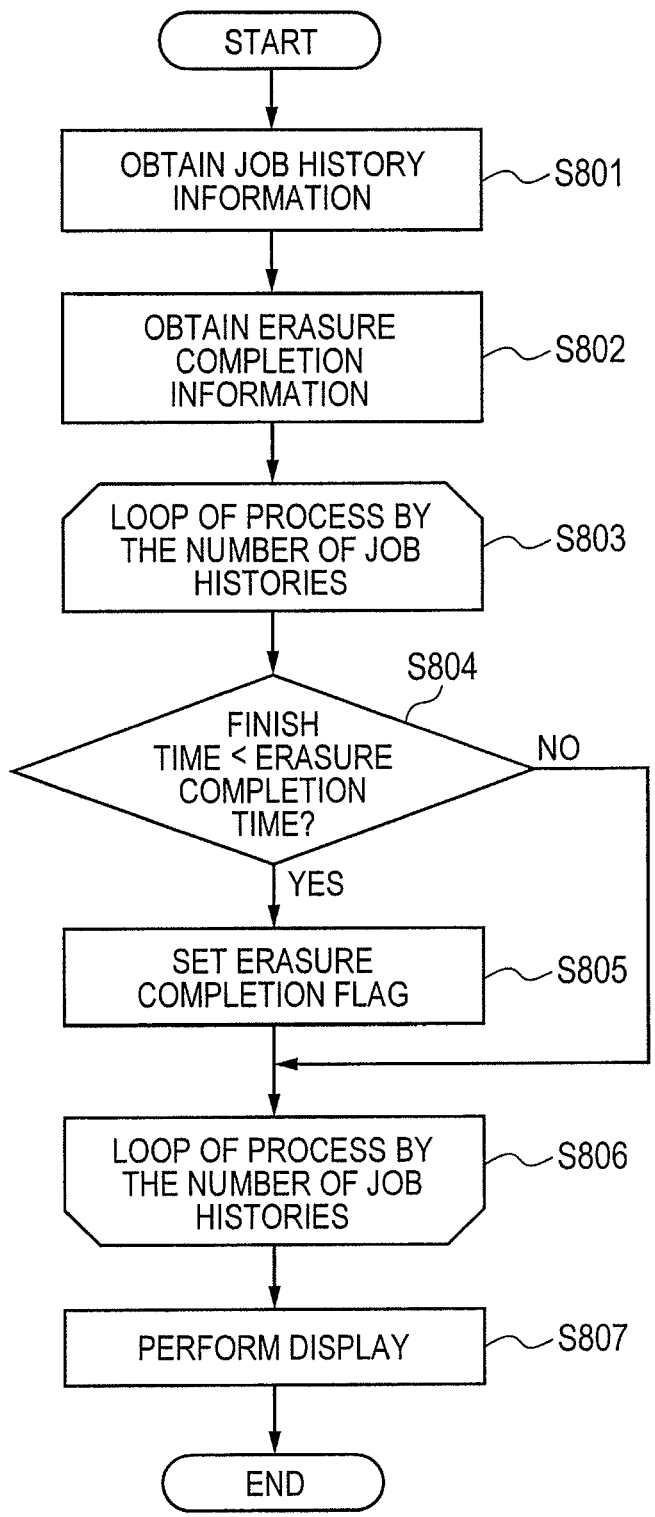

FIG. 9A

JOB SITUATION CONFIRMATION
JOB HISTORY

| DATE AND HOUR | JOB NAME | USER NAME | RESULT | ERASURE |
|---|---|---|---|---|
| 12/14 16:01 | File1 | abcd | OK | ERASED |
| 12/14 16:08 | File2 | dog | OK | UNERASED |
| 12/14 16:09 | File3 | pig | OK | UNERASED |

JOB SITUATION CONFIRMATION
JOB HISTORY

| DATE AND HOUR | JOB NAME | USER NAME | RESULT | ERASURE |
|---|---|---|---|---|
| 12/14 16:01 | File1 | abcd | OK | ERASED |
| 12/14 16:08 | File2 | dog | OK | ERASED |
| 12/14 16:09 | File3 | pig | OK | UNERASED |

OK

INFORMATION PROCESSING APPARATUS, DATA ERASURE MANAGING METHOD AND COMPUTER PROGRAM

BACKGROUND OF THE INVENTION

1. Field of the Invention

The present invention relates to an information processing apparatus, a data erasure managing method, and a computer program for performing the data erasure managing method.

2. Description of the Related Art

There has been proposed an information processing apparatus which temporarily stores information (called data hereinafter) included in a job in an external storing apparatus (e.g., an HDD (Hard Disk Drive) or the like), processes the stored data, and erases the stored and processed data from the HDD when performance of the job is completed.

In the information processing apparatus like this, the data and position information which indicates a position of the relevant data on the HDD have been stored on the HDD. More specifically, the position information has been stored on, e.g., an FAT (File Allocation Table). In general, when the data is erased by the information processing apparatus, only the data on the FAT is erased in terms of speeding up of the process. Namely, the data remaining on the HDD is overwritten by other information and thus erased asynchronously with the erasure of the data on the FAT.

However, in such a state that the data still remains on the HDD, there is a fear that the remaining data is stolen by pulling out the HDD from the information processing apparatus, connecting the pulled-out HDD to a PC (personal computer) or the like, and interpreting the contents of the connected HDD by the PC.

In recent years, an information processing apparatus which has an overwriting erasure function for erasing not only data on an FAT but also other remaining data has been proposed in association with an increase in security consciousness. More specifically, after completion of a job process, the information processing apparatus having the overwriting erasure function like this overwrites already-used data with "0", a random number, a fixed value or the like once or several times asynchronously with the completion of the job process, whereby it is ensured that data does not remain. For example, Japanese Patent No. 03715711 discloses an image processing apparatus which erases image data to which a copy process has been completed, as long as a request for stopping erasure is not input. Moreover, Japanese Patent No. 04386787 discloses a data processing apparatus which performs data erasure when an operation of the apparatus is started, when an instruction is input by a user, or when it is a predetermined time, and then displays a result of the erasure.

In the above information processing apparatus which automatically performs the data erasure asynchronously with the completion of the job process, it is impossible to know the completion of the data erasure for each job. Further, for example, in the data processing apparatus disclosed in Japanese Patent No. 04386787, the data erasure can be performed only at fixed timing such as the start of the operation, the input of the user's instruction, the predetermined time or the like. Therefore, since the data not yet erased are accumulated in this case, a new job cannot be performed and/or a large-capacity HDD is required. As a result, a problem that an efficient operation of the apparatus cannot be performed occurs.

SUMMARY OF THE INVENTION

The present invention aims to provide an information processing apparatus which automatically performs data erasure asynchronously with completion of a job process, and displays completion of the data erasure by each job.

Further features of the present invention will become apparent from the following description of exemplary embodiments with reference to the attached drawings.

BRIEF DESCRIPTION OF THE DRAWINGS

FIGS. 3A and 3B are flow charts for describing an example of the operation process to be performed by the image processing apparatus.

FIG. 6 is a flow chart for describing an example of a data erasure process.

FIG. 7 is a flow chart for describing an example of a process of displaying a job history.

FIGS. 9A and 9B are diagrams respectively illustrating examples of a job history displaying screen.

DESCRIPTION OF THE EMBODIMENTS

Hereinafter, preferred embodiments of the present invention will now be described in detail with reference to the accompanying drawings.

Figure 1:
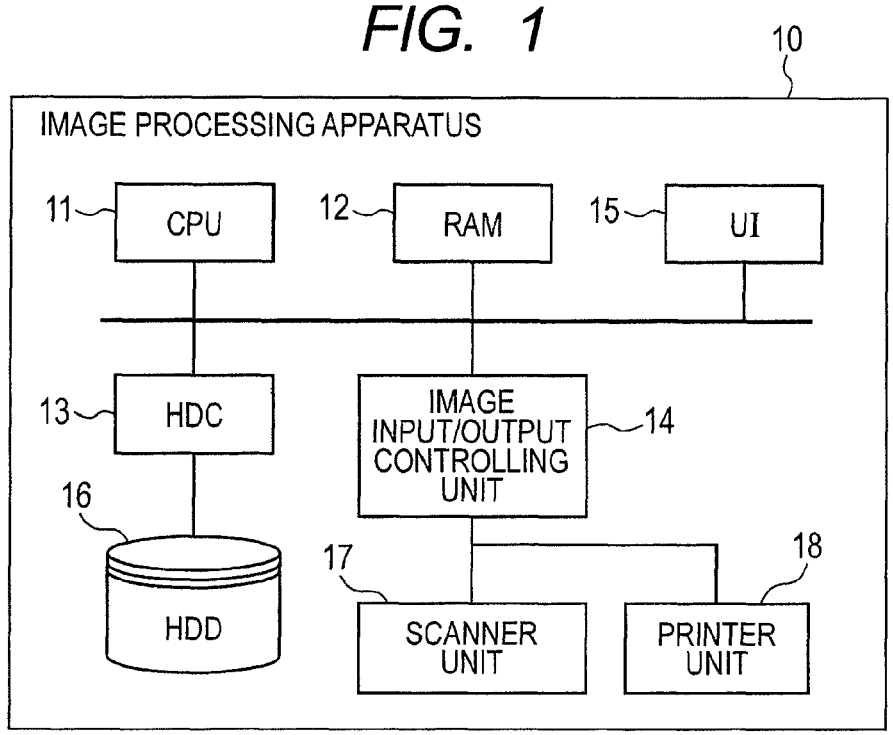
FIG. 1 is a block diagram illustrating an example of a hardware constitution of an information processing apparatus according to an embodiment of the present invention.

FIG. 1 is a block diagram illustrating an example of a hardware constitution of an information processing apparatus according to an embodiment of the present invention. Here, it should be noted that an image processing apparatus 10 illustrated in FIG. 1 is equivalent to the information processing apparatus according to the present embodiment. More specifically, the image processing apparatus 10 is equipped with a CPU (central processing unit) 11, an RAM (random access memory) 12 and an HDC (hard disk controller) 13. Moreover, the image processing apparatus 10 is equipped with an image input/output controlling unit (also called an image controlling unit hereinafter) 14, an operation unit (also called a UI (user interface) hereinafter) 15, an HDD (hard disk drive) 16, a scanner unit 17 and a printer unit 18.

The CPU 11, which is the CPU for controlling the image processing apparatus 10 as a whole, practically controls the HDC 13, the image controlling unit 14 and the UI 15 by using programs and data provided on the RAM 12. Incidentally, the RAM 12 is the volatile storing apparatus on which data can be written and read, and the RAM 12 stores therein the programs and the data as described above. The HDC 13, which controls the HDD 16, concretely controls writing and reading of data to and from the HDD 16. In the present embodiment, the HDC 13 holds a writing data amount and a reading data amount.

Figure 2:
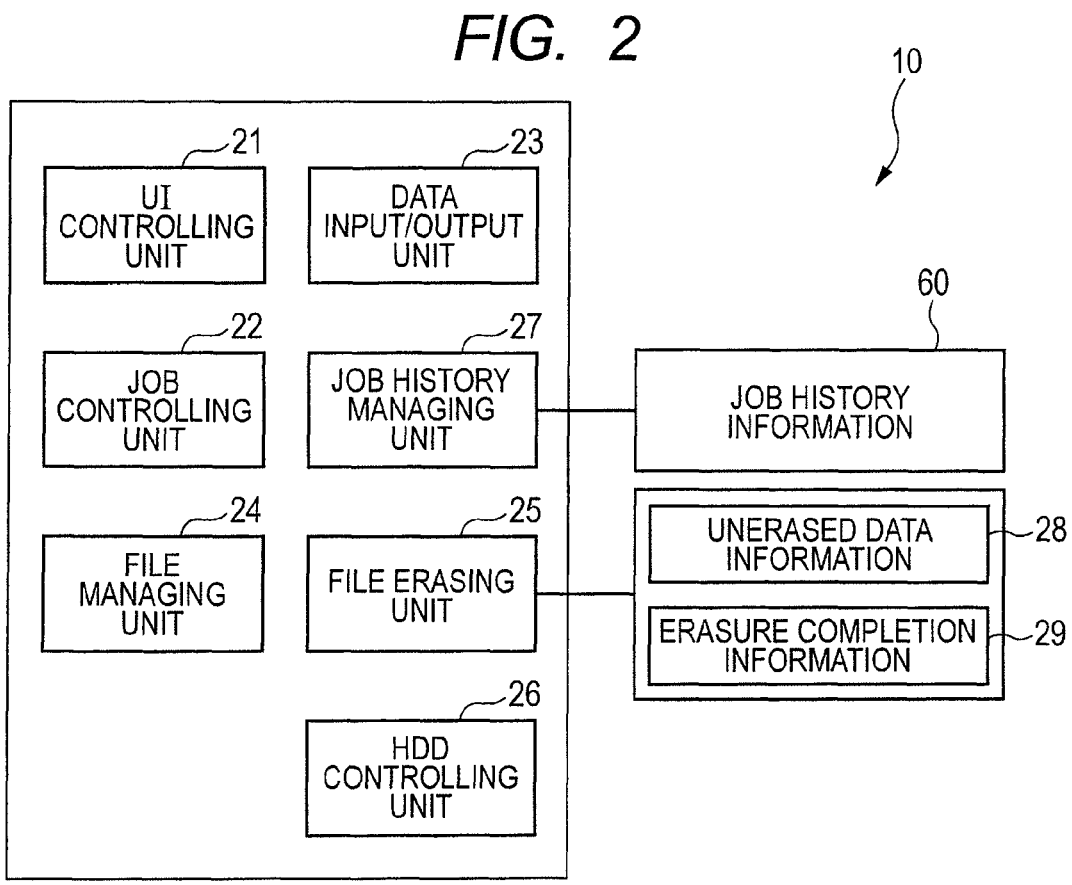
FIG. 2 is a block diagram illustrating an example of function blocks in an image processing apparatus.

The image controlling unit 14 controls the scanner unit 17 and the printer unit 18. More specifically, the image controlling unit 14 transfers the data sent from the scanner unit 17 to the RAM 12 and transfers the data stored in the RAM 12 to the printer unit 18, in accordance with instructions from a data input/output unit 23 (FIG. 2).

The UI 15 is equipped with a liquid crystal displaying unit and a touch panel (both not illustrated). The UI 15 can obtain an operation instruction from a user, and display the states and the like of the image processing apparatus 10. Incidentally, the HDD 16 is the non-volatile storing apparatus on which data can be written and read, and the HDD 16 holds programs, image data, user setting and the like in the form of files.

The scanner unit 17 is equipped with an original document illuminating lamp, a scanning mirror and like (all not illustrated). The scanner unit 17 causes a CCD (charge coupled device) to read reflected light from an original document through the scanning mirror, a lens and the like, generates image data from the read reflected light, and transfers the generated image data to the RAM 12.

The printer unit 18 is equipped with a laser beam generator, a polygonal scanner, a photosensitive drum and the like. The printer unit 18 converts the image data transferred from the RAM 12 into an electrical signal, irradiates the obtained electrical signal as a laser beam onto the photosensitive drum, and then forms an image on a paper on the basis of an electrostatic latent image formed on the photosensitive drum by the irradiated laser beam.

FIG. 2 is a block diagram illustrating an example of the function blocks in the image processing apparatus. It should be noted that each of the function blocks provided in the image processing apparatus illustrated in FIG. 2 is achieved by an image processing apparatus controlling program. Here, the image processing apparatus controlling program is the computer program which is provided on the RAM 12 and performed by the CPU 11. Also, a data erasure managing method according to the present embodiment is achieved by the image processing apparatus controlling program.

The image processing apparatus 10 is equipped with a UI (user interface) controlling unit 21, a job controlling unit 22, the data input/output unit 23, a file managing unit 24, a file erasing unit 25, an HDD (hard disk drive) controlling unit 26 and a job history managing unit 27. Here, the UI controlling unit 21, which controls the UI 15 illustrated in FIG. 1, obtains a user's instruction from the touch panel, and displays the state of the image processing apparatus 10 on a liquid crystal panel. Moreover, the UI controlling unit 21 displays a job history in cooperation with the job history managing unit 27 and the file erasing unit 25.

The job controlling unit 22 controls the process (job) such as copying or the like to be performed by the image processing apparatus 10. Moreover, the job controlling unit 22 serves as a job performing unit which performs a job in cooperation with the UI controlling unit 21, the data input/output unit 23, the file managing unit 24 and the like.

The data input/output unit 23 controls the image controlling unit 14. The data input/output unit 23 holds image data in the RAM 12 while exchanging data with the RAM 12. Moreover, the data input/output unit 23 transmits the image data held in the RAM 12 to the printer unit 18.

The file managing unit 24 writes data to the HDD 16. Moreover, the file managing unit 24 reads out data from the HDD 16. That is, the file managing unit 24 manages a file system constructed on the HDD 16, and stores and reads out one data as a file.

The file erasing unit 25 erases, by overwriting, the file to which erasure has been instructed, in accordance with an instruction by the file managing unit 24. It should be noted that this erasure by overwriting is also called overwriting erasure. The file erasing unit 25 stores unerased data information 28 and erasure completion information 29 in the storing unit (for example, the HDD 16), manages the stored information, and properly updates the managed information while performing an erasure operation. Here, the unerased data information 28 includes an unerased file ID. The unerased file ID is the identification information of the file (unerased file) which is not yet erased by overwriting but is the erasure target. The unerased file ID serves as, for example, the identification information (first identification information) of the image data which is the erasure target. Moreover, the erasure completion information 29 includes a time (erasure completion time) at which the unerased file is erased by overwriting. The HDD controlling unit 26 performs data reading and writing with respect to the HDD 16, in accordance with requests from the file managing unit 24 and the file erasing unit 25.

The job history managing unit 27 holds, as job history information 60, the information concerning the completed job in cooperation with the job controlling unit 22. The job history managing unit 27 judges, based on the job history information 60 and the unerased data information 28, whether or not the data erasure has been completed for each job. For example, it is judged whether or not overwriting erasure of the image data included in the job has been completed. Thus, the job history managing unit 27 serves as a predicting unit which predicts whether or not the erasure was completed for each job. Moreover, the UI controlling unit 21 serves as a displaying unit for displaying the judged information indicating whether or not the overwriting erasure of the image data included in the job has been completed. Incidentally, the job history managing unit 27 may judge, based on the job history information 60 and the erasure completion information 29, whether or not the data erasure has been completed for each job, and the UI controlling unit 21 may display the information indicating a result of the judgment.

FIGS. 3A and 3B are flow charts for describing an example of the operation process to be performed by the image processing apparatus according to a first embodiment. More specifically, FIG. 3A indicates the overall operation process to be performed by the image processing apparatus. Here, it should be noted that an image processing apparatus controlling program for performing the process described with reference to FIGS. 3A and 3B has been stored in the HDD 16 or another not-illustrated storing apparatus, and the stored program is read out to the RAM 12 and actually performed by the CPU 11.

Figure 5A:
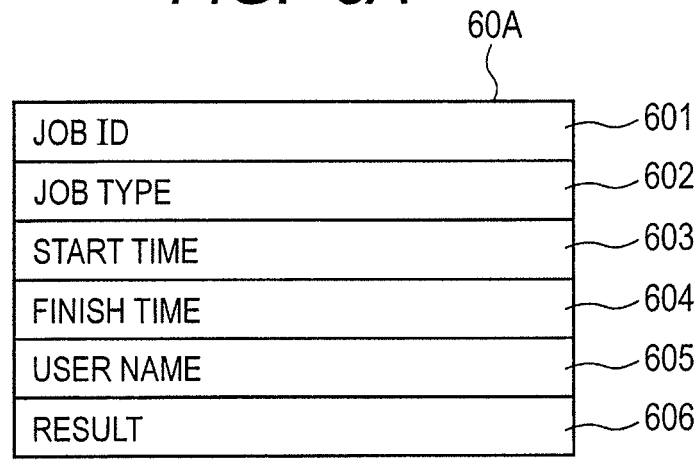
FIGS. 5A and 5B are diagrams illustrating examples of job history information.

When copying of an original document is instructed by a user through the UI 15, an input of such an instruction is accepted by the UI controlling unit 21. Then, the job controlling unit 22 is instructed by the UI controlling unit 21 to start a copy job based on designated setting (step S301), whereby the job is started. At the time when the job is started, for example, job history information 60A illustrated in FIG. 5A is newly created by the job controlling unit 22. Here, it should be noted that the job history information 60A corresponds to the job history information 60 illustrated in FIG. 2.

Namely, FIG. 5A illustrates an example of the job history information. The job history information 60A includes data items such as a job ID (identification data) 601, a job type 602, a start time 603, a finish time 604, a user name 605 and a result 606. More specifically, the job ID 601 is the identification information for uniquely identifying the job, the job type 602 is the information indicating the type or kind of job, the start time 603 is the information indicating the start time of the job, the finish time 604 is the information indicating the finish time of the job, the user name 605 is the information indicating the name of the user, and the result 606 is the information indicating the result obtained when the job is performed. In the step S301 of FIG. 3A, the job ID 601, the job type 602, the start time 603 and the user name 605 are set in the job history information 60A by the job controlling unit 22.

Subsequently, reading of the original document is instructed to the data input/output unit 23 by the job controlling unit 22. Then, under the control of the data input/output unit 23, an original document is read by using the image controlling unit 14 and the scanner unit 17, an image obtained from the read original document is converted into image data (step S302), and the converted image data is stored in the RAM 12. Subsequently, the job controlling unit 22 instructs the file managing unit 24 to store the image data stored in the step S302 to the HDD 16 as an image file.

The file managing unit 24 controls the HDC 13 in cooperation with the HDD controlling unit 26. Thus, the image file is stored in the HDD 16 (step S303). In the step S303, under the control of the HDD controlling unit 26, a data amount requested to the HDD 16 is held therein as a requested data amount.

Subsequently, the job controlling unit 22 instructs the data input/output unit 23 to print the image data. Thus, in the data input/output unit 23, the image data held in the RAM 12 is printed on a paper by using the image controlling unit 14 and the printer unit 18 under the control of the job controlling unit 22 (step S304).

Subsequently, the job controlling unit 22 instructs the file managing unit 24 to delete the image file. Then, the file managing unit 24 instructs the file erasing unit 25 to erase the image file according to an instruction of the job controlling unit 22. Thus, the file erasing unit 25 sets the relevant image file as an erasure target according to the instruction of the file managing unit 24 (step S305). More specifically, the file erasing unit 25 adds the relevant image file as the erasure target, and updates, for example, the unerased data information 28 in the HDD 16. Then, a job finish process is performed by the job history managing unit 27 according to the instruction of the job controlling unit 22 (step S306). That is, the job controlling unit 22, the file managing unit 24 and the file erasing unit 25 serve as a managing unit which performs the following processes. Incidentally, when performance of the job is completed, the managing unit sets the image data included in the relevant job as the erasure target, and stores information concerning the image data being the erasure target in a first storing unit (i.e., a predetermined storing area of the HDD 16) as unerased data information.

FIG. 3B indicates an example of the job finish process. That is, the job history managing unit 27 stores the finish time 604 and the result 606 of the performance in the job history information 60A (FIG. 5A) according to the instruction of the job controlling unit 22. Here, the job history information 60A is stored in, for example, the HDD 16, whereby the job history information is resultingly updated (step S401). That is, the job controlling unit 22 serving as the managing unit stores the history information of the job at least including the information of the time when the relevant job was completed in a second storing unit (i.e., a predetermined storing area of the HDD 16), and manages the stored information. Thus, the process of the job is finished. The file which has been set as the erasure target in the step S305 of FIG. 3A is erased asynchronously with the process of the job.

FIG. 6 is a flow chart for describing an example of a data erasure process. Here, it should be noted that the data erasure process is repeatedly performed at predetermined intervals. The file erasing unit 25 manages, in the unerased data information 28, the unerased file while associating it with the unerased file ID being the ID for uniquely identifying the relevant unerased file. Initially, it is judged by the erasing unit 25 whether or not an unerased file is present. Then, when it is judged that the unerased file is present, later-described processes in steps S702 and S703 are repeatedly performed by the number of times corresponding to the number of the unerased files (steps S701 and S704).

First, the file erasing unit 25 performs the overwriting erasure process to the file (image file) being the erasure target (step S702). More specifically, the file erasing unit 25 writes, e.g., "0" data, a random number, another fixed value or the like to the overall file once or several times, and deletes the file from the file managing unit 24. Subsequently, the file erasing unit 25 erases the unerased file to which the overwriting erasure process has been completed and the unerased file ID corresponding to the relevant unerased file, from the unerased data information 28 (step S703). At a time when the unerased file is gone, the file erasing unit 25 records the relevant time when the unerased file is gone to the erasure completion information 29 as the erasure completion time (step S705). By doing so, the erasure completion time is resultingly updated. In other words, the file erasing unit 25 serves as an erasing unit which erases, by overwriting, the image data being the erasure target indicated by the unerased data information, and stores, in a third storing unit (e.g., a predetermined storing area of the HDD 16), the erasure completion information including the information indicating the time when the erasure was completed.

FIG. 7 is a flow chart for describing an example of a process of displaying the job history. Here, it should be noted that the job history managing unit 27 displays the job history in cooperation with the UI controlling unit 21 according to the flow chart shown in FIG. 7.

Initially, the job history managing unit 27 obtains an entry (job history) of the job history information 60A (step S801). Subsequently, the job history managing unit 27 obtains the erasure completion information 29 from the file erasing unit 25 (step S802). Then, in the job history managing unit 27, later-described processes in steps S804 and S805 are repeatedly performed by the number of times corresponding to the number of the job histories to be displayed (steps S803 and S806).

First, the job history managing unit 27 compares the finish time 604 included in the job history and the erasure completion time included in the erasure completion information 29 with each other, and judges based on the compared result whether or not the erasure completion time is later than the finish time 604 (FINISH TIME<ERASURE COMPLETION TIME?) (step S804). Then, when the job history managing unit 27 judges that the erasure completion time is not later than the finish time 604 (NO in this step), the process advances to a next step.

On the other hand, when the job history managing unit 27 judges that the erasure completion time is later than the finish time 604, then the job history managing unit registers an erasure completion flag in a predetermined storing unit while associating the relevant erasure completion flag with the job indicated by the job history. Here, it should be noted that the erasure completion flag is the information which indicates that the erasure process for erasing the file included in the corresponding job has been completed. Then, the job history managing unit 27 displays the job history on a job history displaying screen (step S807). More specifically, with respect to the job for which the erasure completion flag has been registered, the job history managing unit 27 displays on the job history displaying screen the information indicating that the overwriting erasure process for the file included in the relevant job has been completed. On the other hand, with respect to the job for which the erasure completion flag is not registered, the job history managing unit 27 displays on the job history displaying screen the information indicating that the overwriting erasure process for the file included in the relevant job is not completed.

As just described, the job history managing unit 27 serves as a judging unit which performs the following process. That is, the job history managing unit 27 judges, based on the information included in the job history information and indicating the time when the performance of the job was completed and the information included in the erasure completion information and indicating the time when the erasure was completed, whether or not the overwriting erasure of the image data included in the job corresponding to the history information has been completed for each job. More specifically, the job history managing unit 27 judges whether or not the time when the erasure was completed is later than the time when the performance of the job was completed. When it is judged that the time when the erasure was completed is later than the time when the performance of the job was completed, the job history managing unit 27 judges that the overwriting process of the image data included in the relevant job has been completed.

FIG. 9A is a diagram illustrating an example of the job history displaying screen. On the illustrated job history displaying screen, the job history at the time immediately after the job of "File 3" was completed. In this example, it is assumed that the erasure completion time is updated only after the erasure process of the file included in each of the jobs of "File 1" to "File 3" was completed. Here, on the illustrated job history displaying screen, an indication "DATE AND HOUR" indicates the time when the job was completed, an indication "JOB NAME" indicates the name of the job, an indication "USER NAME" indicates the name of the user, and an indication "RESULT" indicates the result obtained when the job was performed, and an indication "ERASURE" indicates whether or not the overwriting erasure process for the file included in the job has been completed.

When the overwriting erasure process for the file included in the job has been completed, an indication "ERASED" is displayed in regard to the indication "ERASURE". On the other hand, when the overwriting erasure process for the file included in the job is not completed, an indication "UNERASED" is displayed in regard to the indication "ERASURE". At this point, the unerased file is still present in the unerased data information 28, and the erasure completion time is, for example, "16:02". In practice, although the data of the job of "File 2" has been erased, since the unerased file is still present, the erasure completion time is not updated. For this reason, the job history displaying screen displays that the overwriting erasure process for the file is not completed in regard to the job of "File 2" and the job of "File 3".

Subsequently, a second embodiment will be described hereinafter. In the second embodiment, the image processing apparatus 10 displays the job history by referring to the unerased data information 28 instead of the erasure completion information 29. Here, the constitution of the image processing apparatus 10 is the same as that of the image processing apparatus in the first embodiment. Further, the operation process of the image processing apparatus in the second embodiment is the same as the operation process of the image processing apparatus in the first embodiment already described with reference to FIG. 3A. Furthermore, the data erasure process of the image processing apparatus in the second embodiment is the same as the data erasure process already described with reference to FIG. 6.

Figure 4:
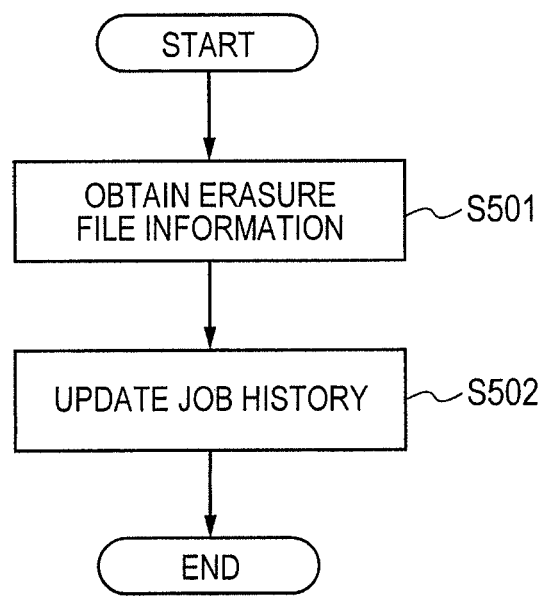
FIG. 4 is a flow chart for describing a job finish process.

FIG. 4 is a flow chart for describing the job finish process in the second embodiment. More specifically, in the job finish process, the job history managing unit 27 first obtains the information (erasure file information) of the file added as the erasure target in the step S305 of FIG. 3A (step S501). Here, the erasure file information includes the erasure file ID, and the relevant erasure file ID is the identification information for uniquely identifying the file of the erasure target.

Figure 5B:
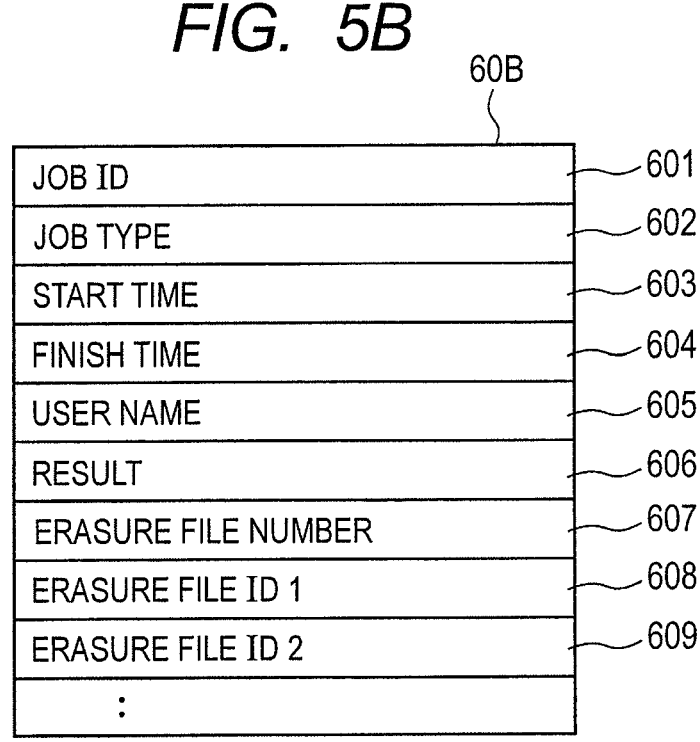

Then, the job history managing unit 27 includes, in job history information 60B illustrated in FIG. 5B, the erasure file ID in the erasure file information together with a finish time, a performance result and the number of erasure files, and then stores the obtained job history information (step S502). Here, it should be noted that the job history information 60B corresponds to the job history information 60 illustrated in FIG. 2. That is, in the second embodiment, as second identification information, the job history information includes, for example, the identification information of the image data being the erasure target corresponding to the job.

FIG. 5B is the diagram illustrating an example of the job history information in the second embodiment. Here, it should be noted that, among the information included in the job history information 60B, a job ID 601 to a result 606 are respectively the same as the job ID 601 to the result 606 included in the job history information 60A illustrated in FIG. 5A.

In addition to the job ID 601 to the result 606, the job history information 60B includes an erasure file number 607 (i.e., the number of erasure files), an erasure file ID 1 608, an erasure file ID 2 609, and the like. Here, the erasure file number 607 indicates the number of files being the erasure target, i.e., the number of unerased files. In other words, when the erasure file number 607 comes to be equivalent to "0", it means that the overwriting erasure process for all the files included in the job corresponding to the relevant job history is completed.

Figure 8:
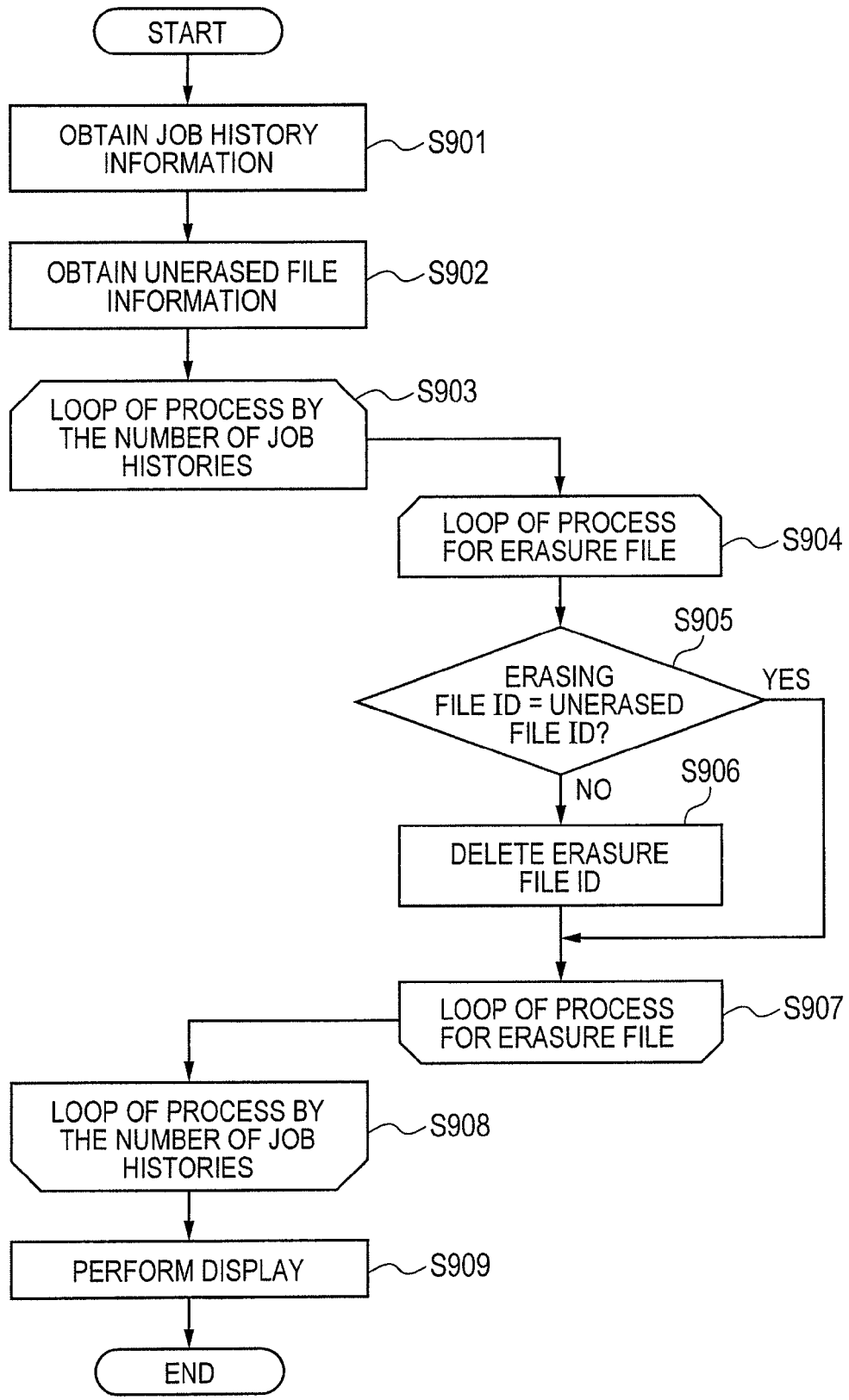
FIG. 8 is a flow chart for describing an example of the process of displaying the job history.

FIG. 8 is a flow chart for describing an example of a process of displaying the job history in the second embodiment. Initially, the job history managing unit 27 obtains an entry (job history) of the job history information 60B (step S901). Subsequently, the job history managing unit 27 obtains the unerased data information 28 from the file erasing unit 25 (step S902).

Then, in the job history managing unit 27, later-described processes in steps S904 to S907 are repeatedly performed by the number of times corresponding to the number of the job histories to be displayed (steps S903 and S908). More specifically, in the job history managing unit 27, processes in steps S905 and S906 are repeatedly performed by the number of times corresponding to the erasure file number 607 included in the job history information 60B (steps S904 and S907).

In the step S905, the job history managing unit 27 compares the erasure file ID included in the job history and the unerased file ID included in the unerased data information 28 with each other. Thus, it is judged by the job history managing unit 27 whether or not the erasure file ID included in the job history information 60B coincides with the unerased file ID included in the unerased data information 28 (step S905).

When it is judged that the erasure file ID coincides with the unerased file ID, the process advances to a step for a next erasure file. On the other hand, when it is judged that the erasure file ID does not coincide with the unerased file ID, the job history managing unit 27 deletes the relevant erasure file ID from the job history information 60B (step S906).

Further, the job history managing unit 27 reduces the erasure file number 607 by one, and the process advances to a next erasing step. Here, the reason why the job history managing unit 27 erases the erasure file ID in the step S906 will be described hereinafter. That is, in the step S703 of FIG. 6, the unerased file ID corresponding to the unerased file to which the overwriting erasure process has been completed was erased from the unerased data information 28. Consequently, the fact that the erasure file ID does not coincide with the unerased file ID means that the overwriting erasure process to the file corresponding to the unerased file ID has been completed. That is, in the case where the unerased file ID does not include all the erasure file IDs included in the job history, the job history managing unit 27 judges that the overwriting erasure of the image data included in the job corresponding to the job history has been completed. When the process to all the erasure files is completed, the job history managing unit 27 displays the job history on the job history displaying screen (step S909). Thus, the indication notifying whether or not the overwriting erasure process to the file included in the job has been completed is displayed with respect to each job.

FIG. 9B is a diagram illustrating an example of the job history displaying screen in the second embodiment. On the illustrated job history displaying screen, the job history at the time immediately after the job of "File 3" was completed. In this example, it is assumed that, although the unerased file is still present in the unerased data information 28, all the files included in the job of "File 2" have been erased by overwriting. Consequently, the indication notifying that the erasure of the job in "File 2" has been completed is displayed on the job history displaying screen.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-141547, filed Jun. 27, 2011, which is hereby incorporated by reference herein in its entirety.

What is claimed is:

1. An information processing apparatus comprising:
a storage unit configured to store a job;
a performing unit configured to perform the job stored in the storage unit;
an erasing unit configured to perform overwriting erasure of data stored in the storage unit, asynchronously with finishing of the job;
a recording unit configured to record, for each job, a finish time when the performance of the job is finished;
an updating unit configured to update an erasure completion time each time the overwriting erasure of data stored in the storage unit is completed; and
a judging unit configured to judge, for each job, that the erasure of the job is completed, if the finish time of the job is earlier than a current erasure completion time, and that the erasure of the job is not completed, if the finish time of the job is not earlier than the current erasure completion time.

2. The information processing apparatus according to claim 1, wherein the judging unit judges that the erasure of the job was completed, in a case where the time indicated by the erasure completion time is later than the time indicated by the finish time.

3. The information processing apparatus according to claim 1, further comprising a displaying unit configured to display a judging result by the judging unit for each job.

4. The information processing apparatus according to claim 1, wherein the finish time is stored in the storage unit.

5. The information processing apparatus according to claim 1, wherein the information erasure completion time is stored in the storage unit.

6. An information processing method comprising:
storing a job;
performing the stored job;
performing overwriting erasure of data, asynchronously with finishing of the job;
recording, for each job, a finish time when the performance of the job is finished;
updating an erasure completion time each time the overwriting erasure of data is completed; and
judging, for each job, that the erasure of the job is completed, if the finish time of the job is earlier than a current erasure completion time, and that the erasure of the job is not completed, if the finish time of the job is not earlier than the current erasure completion time.

7. A non-transitory computer-readable medium which stores a computer program for causing a computer to perform an information processing method comprising:
storing a job;
performing the stored job;
performing overwriting erasure of data, asynchronously with finishing of the job;
recording, for each job, a finish time when the performance of the job is finished;
updating erasure completion time each time when the overwriting erasure of data is completed; and
judging, for each job, that the erasure of the job is completed, if the finish time of the job is earlier than a current erasure completion time, and that the erasure of the job is not completed, if the finish time of the job is not earlier than the current erasure completion time.

* * * * *